United States Patent [19]
Sulzbach et al.

[11] Patent Number: 5,833,930
[45] Date of Patent: Nov. 10, 1998

[54] APPARATUS FOR FOAM MANUFACTURING USING CARBON DIOXIDE DISSOLVED UNDER PRESSURE

[75] Inventors: Hans-Michael Sulzbach, Königswinter; Ferdinand Althausen, Neunkirchen; Herbert Steilen, Königswinter; Reiner Raffel, Siegburg; Robert Eiben; Wilfried Ebeling, both of Köln, all of Germany

[73] Assignees: Maschinenfabrik Hennecke GmbH; Bayer Aktiengesellschaft, both of Leverkusen, Germany

[21] Appl. No.: 795,841

[22] Filed: Feb. 6, 1997

Related U.S. Application Data

[62] Division of Ser. No. 572,394, Dec. 14, 1995, Pat. No. 5,643,970.

[30] Foreign Application Priority Data

Dec. 27, 1994 [DE] Germany ............ 44 46 876.8

[51] Int. Cl.⁶ ........................................... C08F 5/02
[52] U.S. Cl. .................. 422/133; 422/134; 422/135; 521/155
[58] Field of Search ............... 422/133, 135, 422/134; 366/159; 521/155

[56] References Cited

U.S. PATENT DOCUMENTS

| | | | |
|---|---|---|---|
| 3,184,419 | 5/1965 | Merriman | 260/2.5 |
| 3,297,474 | 1/1967 | Shields | 117/104 |
| 3,927,162 | 12/1975 | Stalter, Sr. | 264/51 |
| 4,201,321 | 5/1980 | Patzelt et al. | 222/478 |
| 4,772,129 | 9/1988 | Woitzel | 366/177 |
| 4,876,071 | 10/1989 | Toda et al. | 422/133 |
| 5,120,770 | 6/1992 | Doyle | 521/99 |
| 5,312,596 | 5/1994 | Proksa et al. | 422/133 |
| 5,521,224 | 5/1996 | Sulzbach et al. | 521/155 |
| 5,523,063 | 6/1996 | Anderson | 422/224 |

FOREIGN PATENT DOCUMENTS

| | | |
|---|---|---|
| 2127475 | 1/1995 | Canada . |
| 145250 | 6/1985 | European Pat. Off. . |
| 683027 | 8/1996 | European Pat. Off. . |
| 2628785 | 12/1977 | Germany . |
| 3126125 | 12/1982 | Germany . |
| 803771 | 10/1958 | United Kingdom . |
| 2116574 | 9/1990 | United Kingdom . |

*Primary Examiner*—Nina Bhat
*Attorney, Agent, or Firm*—Joseph C. Gil; Noland J. Cheung

[57] ABSTRACT

For the expansion of a liquid containing gas under pressure in dissolved form, it is proposed that the liquid be passed with expansion through an extended flow channel with a small cross-sectional measurement with generation of high rates of shear. The velocity of the liquid is then reduced prior to the foaming.

3 Claims, 4 Drawing Sheets

FIG. 1
FIG. 2
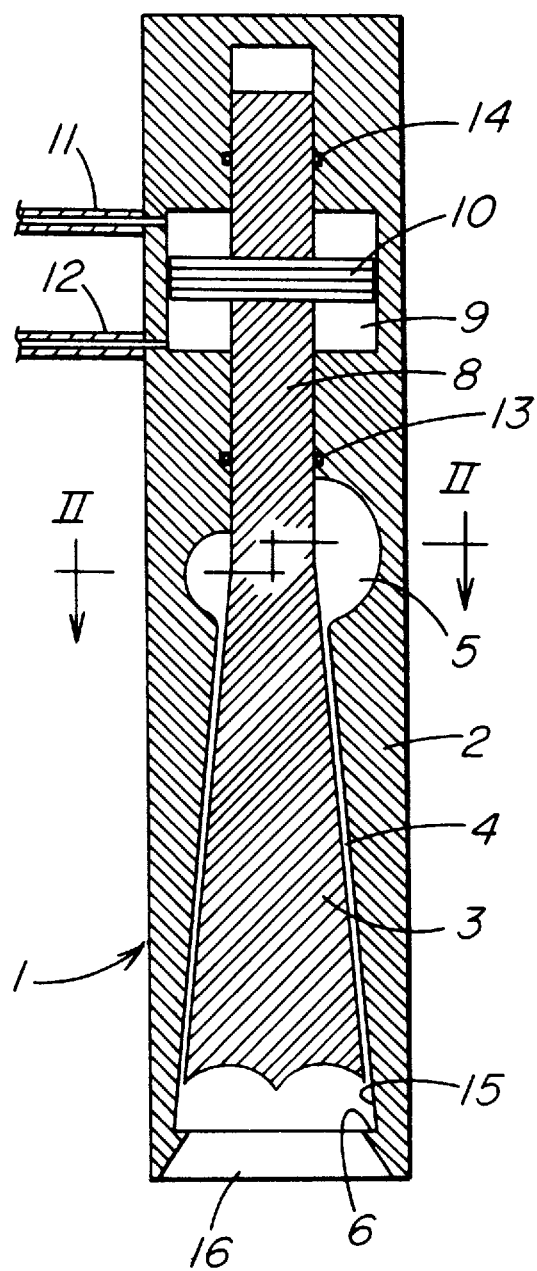
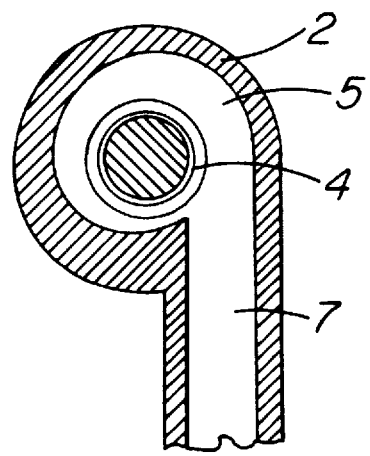

Fig. 3
Fig. 4
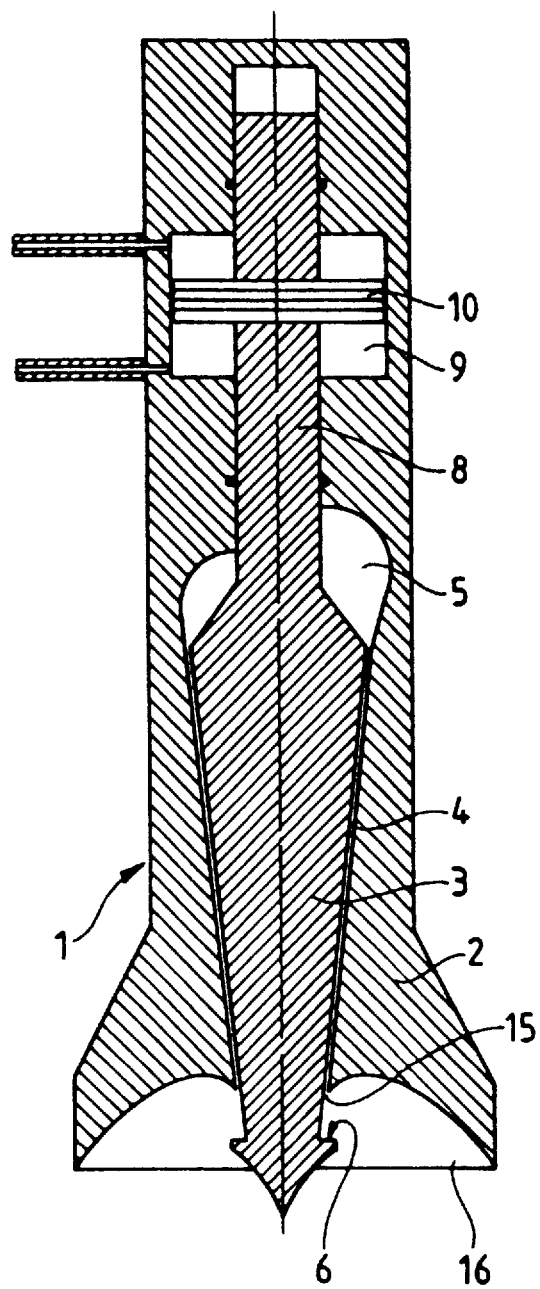
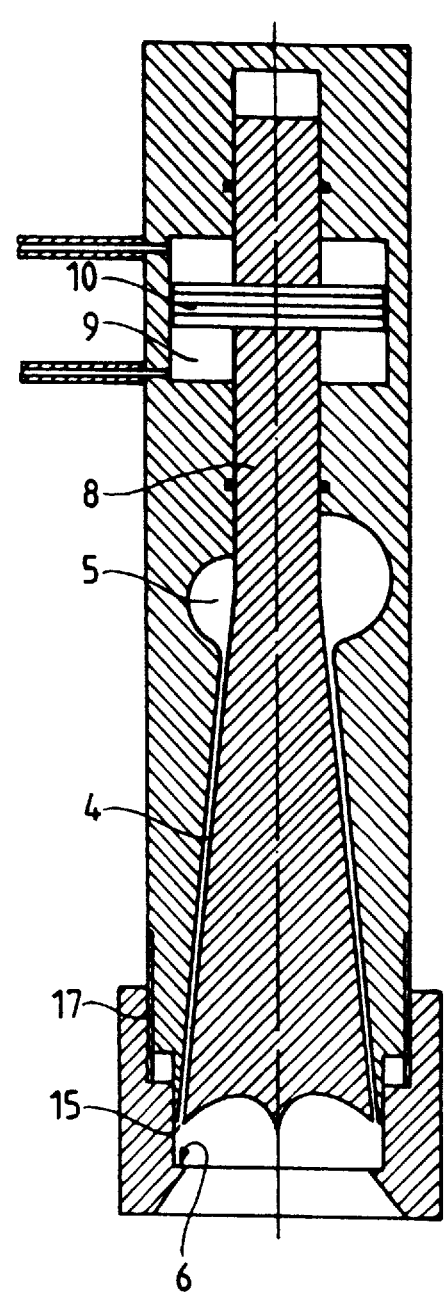

FIG. 5
FIG. 6
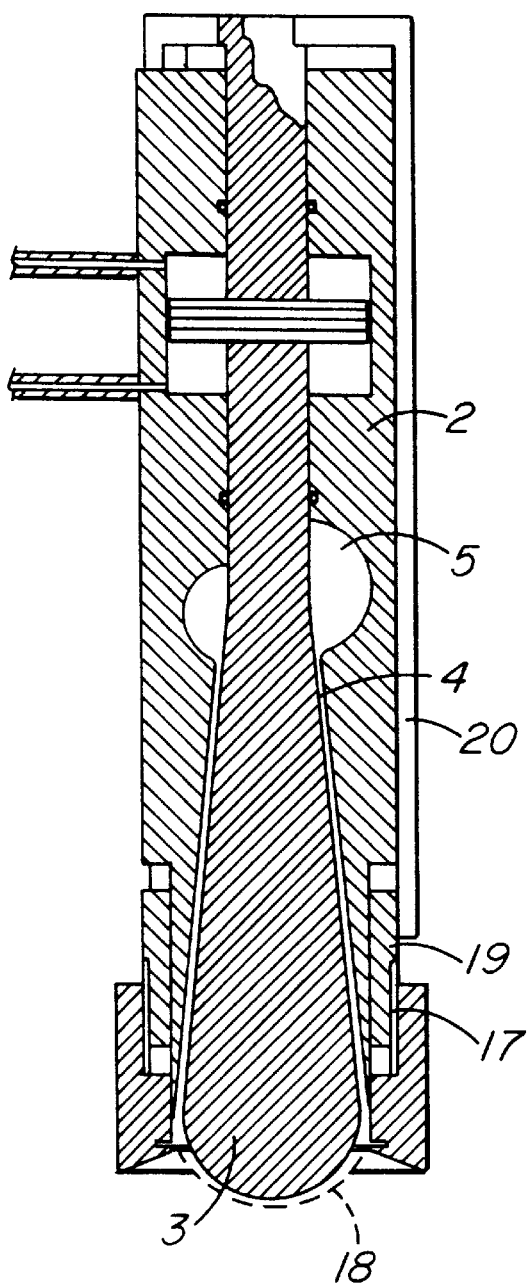
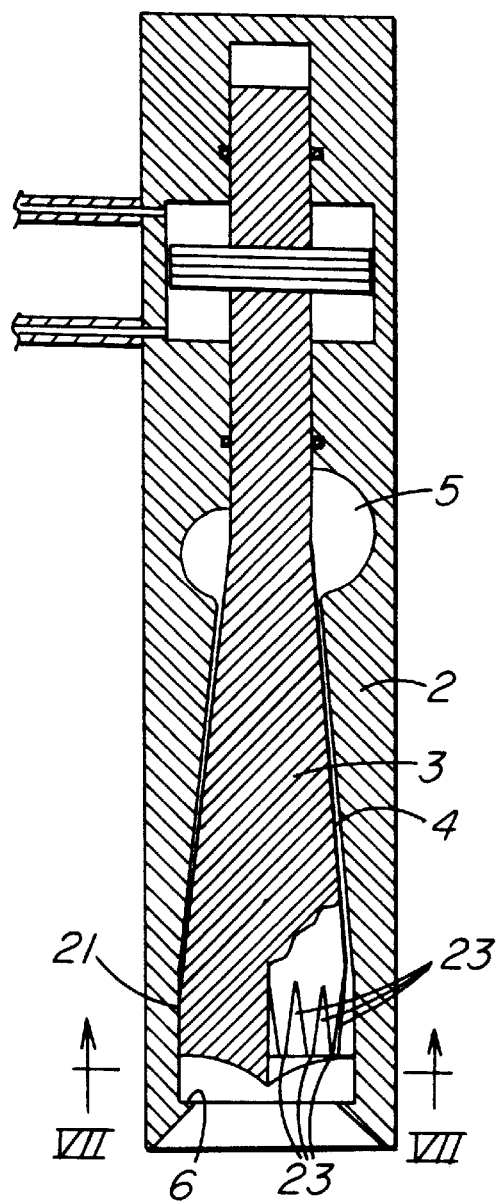
FIG. 7
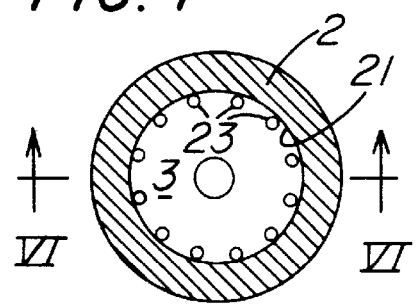

APPARATUS FOR FOAM MANUFACTURING USING CARBON DIOXIDE DISSOLVED UNDER PRESSURE

This application is a division of application Ser. No. 08/572,394 filed Dec. 14, 1995 now U.S. Pat. No. 5,643,970.

BACKGROUND OF THE INVENTION

The present invention relates to a method and an apparatus for manufacturing foams using carbon dioxide dissolved under pressure as blowing agent, wherein the material to be foamed is mixed under pressure with carbon dioxide (preferably with liquid carbon dioxide) and is then expanded with foam formation. There foamable materials are used as liquid starting products for plastics materials, which cure to the foamed plastic by virtue of a polyaddition or a polycondensation reaction commencing after the foaming. The invention relates in particular to polyurethane foams.

For the manufacture of polyurethane foams at least one of the reactive components (i.e., compounds containing polyisocyanate and isocyanate-reactive hydrogen atoms, in particular polyols) is blended with a liquid or gaseous blowing agent and is thereafter mixed with the other component. The mixture obtained is fed either discontinuously into a mold or continuously onto a conveyor belt, where the mixture foams up and cures.

A number of methods have found wide application in the industry for the production of the foam. For example, liquids (such as low-molecular weight chlorofluorocarbons, methylene chloride, pentane and the like) which evaporate out of the still liquid reactive mixture and form bubbles (physical foam production) are often used. Alternatively, air can be injected into the reactive mixture or into one of the components (mechanical foam production). Finally water can be added as a blowing agent to the polyol component in the case of polyurethane foams, which after mixing with the isocyanate component releases carbon dioxide as foam gas by reaction with the isocyanate (chemical foam production).

For reasons of environmental compatibility and occupational health and because of the comparatively high solubility of liquid carbon dioxide in the polyol component, liquid carbon dioxide has already been proposed as blowing agent many times (see, e.g., British patent 803,771; U.S. Pat. Nos. 3,184,419 and 5,120,770; and published European patent application 645,226). Carbon dioxide has however not found acceptance to date in the industry, due apparently to the difficulties of producing regular foams during the required expansion of the reactive mixture to pressures of between 10 and 20 bar. Directly after the expansion, the carbon dioxide evaporates relatively suddenly, so that a violent increase in volume of the reaction mixture by a factor of, for example, about 10, takes place, which is difficult to control. In addition, the reactive mixture is susceptible to delays in the release of the carbon dioxide (which can lie 3 to 6 bar below the equilibrium vapor pressure of $CO_2$ at the respective temperature) so that sudden explosive-type carbon dioxide releases occur, resulting in large bubbles or voids being incorporated in the foam.

According to German patent 2,628,785, it has been proposed, in order to produce nuclei for the carbon dioxide release, to introduce air into the polyol component before carbon dioxide is dissolved in the polyol.

According to European patent 145,250, the capacity of the carbon dioxide to form adducts with water and other low-molecular liquids is used to achieve a delayed release of the carbon dioxide from the reactive mixture, so that the start of the foam formation through release of the carbon dioxide is delayed until after the pressure relief of the reactive mixture. After decomposition of the adduct the water is available as an additional chemical blowing agent. However, the controllability of the foam formation in a large-scale process is not significantly improved in this way, since both adduct formation and adduct decomposition are extremely unstable compared with the other conditions prevailing in the reactive mixture, unless the adducts manufactured in a separate step were to be used in combination with low-molecular tertiary amines, which apparently have an exceedingly long decomposition time compared with spontaneously formed water/$CO_2$ adducts.

Combinations of physically dissolved carbon dioxide and other low-boiling physical or chemical blowing agents such as water or chlorofluorocarbons are already also proposed according to European patent 89,796.

None of these proposals has led to industrially applicable solutions for the use of $CO_2$ dissolved physically under pressure as a blowing agent for polyurethane foam manufacture.

The investigations on which the present invention is based start from the idea that the conditions under which the polyurethane reactive mixture containing pressurized $CO_2$ is expanded have a significant influence on the foam formation.

According to U.S. Pat. No. 3,184,419, the reactive mixture containing pressurized carbon dioxide exiting from the mixing device is apparently expanded suddenly by means of a valve. According to European patent 145,250, the expansion should take place gradually, wherein the gradual reduction in pressure can take place during the flow of the reactive mixture containing carbon dioxide through a tube. The fact that the release of part of the gas still takes place in the tube is not necessarily regarded as a disadvantage, since bubble nucleation can be supported in this way. It has been found in the course of the investigations on which the present invention is based, however, that such a premature, i.e. spontaneous and non-induced, bubble nucleation is somewhat disadvantageous in terms of the pore structure of the foam, since a foam is generally obtained from such a spontaneous bubble nucleation which not only exhibits a widely varying pore structure, but also sizeable bubbles and voids.

The concept of delayed carbon dioxide release, i.e. release only after placing of the reactive mixture on the molding means (conveyor belt or mold) by forming an adduct of the carbon dioxide with compounds containing hydroxyl groups, also does not lead to a controlled foam formation, because the adducts are extremely unstable under foaming conditions. Consequently considerable amounts of non-adducted carbon dioxide are also always present, which are released spontaneously ahead of time with the corresponding presence of bubble nuclei.

On the basis of these and other observations, we have determined the following requirements for the development of a method for manufacturing foams from two-component reactive plastics using carbon dioxide dissolved physically under pressure as blowing agent:

1. The expansion of the reactive mixture containing carbon dioxide in dissolved form (namely from a pressure at which the mixture is subsaturated up to a pressure at which the mixture is supersaturated with carbon dioxide) must take place within times sufficiently short that release of the carbon dioxide has not occurred before the components are mixed.

2. The formation of bubble nuclei in the liquid two-component reactive mixture must be controlled in such a way that each bubble nucleus produced can participate in identical manner in the release of the carbon dioxide from the reactive mixture, so that as regular pores as possible are produced.
3. Already during the induced bubble nucleation, bubble nuclei must be produced in sufficient numbers corresponding to the pore count in the cured plastics foam.
4. The nucleation must be brought about with a maximum possible supersaturation of the reactive mixture with dissolved carbon dioxide, i.e. directly after the expansion to approximately ambient pressure.

BRIEF DESCRIPTION OF THE DRAWINGS

FIG. 1 shows a longitudinal/cross-section through a first embodiment of the present invention with conically expanding, rotationally symmetrical flow channel and baffles for reducing the flow rate of the liquid.

FIG. 2 shows a cross-section A—A through the apparatus of FIG. 1.

FIG. 3 shows a further embodiment of the present invention with conically narrowing flow channel.

FIG. 4 shows an embodiment according to FIG. 1, in which the distance of the baffles from the outlet end of the flow channel is variable.

FIG. 5 shows a further embodiment of the present invention, wherein the means for reducing the flow rate of the liquid is a screen.

FIG. 6 shows an embodiment of the present invention, in which the discharge end of the flow channel is shaped in the form of a large number of outlet openings.

FIG. 7 shows a cross-section B—B through the apparatus of FIG. 6.

DESCRIPTION OF THE INVENTION

Figure 8:
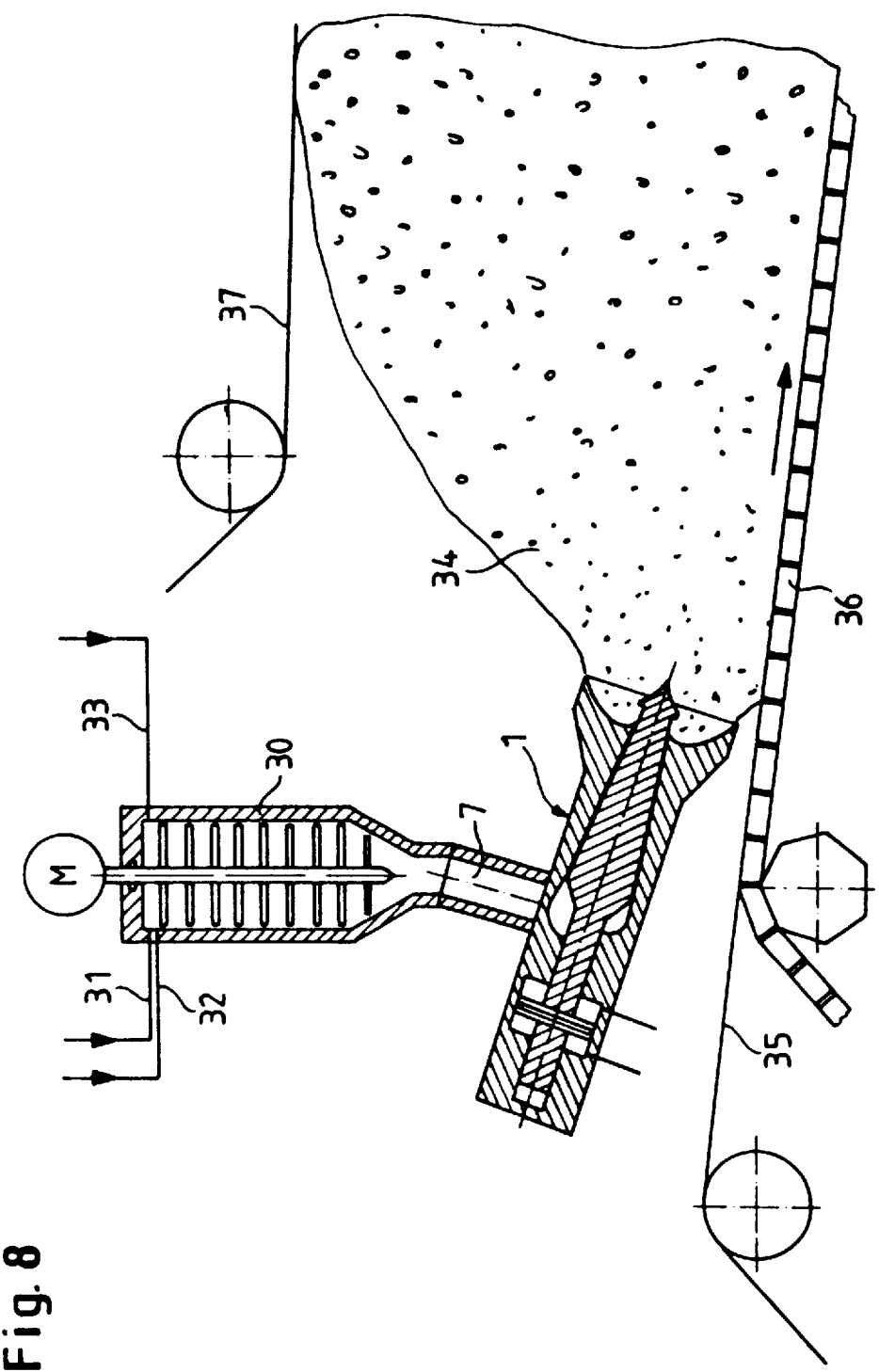
FIG. 8 shows a partial view of an arrangement for manufacturing polyurethane foam using a foam generating apparatus according to FIG. 3.

According to the invention it is proposed to carry out the expansion in a short time from a pressure above the saturation pressure for the dissolved carbon dioxide to virtually atmospheric pressure in an extended flow channel with a small cross-sectional measurement in at least one direction and to bring about the bubble nucleation by generating high rates of shear in the reactive mixture.

More particularly, the present invention is directed to a method for manufacturing foam from a liquid containing gas dissolved under pressure by expansion of the liquid to a pressure below the saturation pressure for the gas and release of the gas, comprising passing the liquid is through an extended flow channel, wherein the pressure is reduced as the flow resistance is increased with the generation of high rates of shear, and then prior to the foaming up of the liquid the flow rate of the liquid is reduced to $\frac{1}{10}$ to $\frac{1}{500}$.

In particular the invention relates to a method for manufacturing foams from at least two reactive components using carbon dioxide as blowing agent by the mixing of at least one of the reactive components with carbon dioxide under pressure, mixing of the components one at least of which contains carbon dioxide under pressure, expanding the liquid reactive mixture containing carbon dioxide and curing the resultant product.

The rate of shear generated in the flow channel is preferably more than $10^4$/second, more preferably more than $10^5$/second, and most preferably more than $10^6$ second.

The residence time of the reactive mixture in the flow channel is preferably less than 10 milliseconds, and more preferably less than 1 millisecond.

The present invention also provides an apparatus for the expansion of a liquid with foam formation, which liquid is pressurized by the gas dissolved in it. In a housing is provided at least one flow channel extended in the flow direction and with a small cross-sectional measurement in at least one dimension. On one side of the flow channel, a chamber for the distribution of the pressurized liquid through at least one inlet opening of the flow channel is located within the housing. The distribution chamber is fed from a supply line for the pressurized liquid. Downstream of the exit opening from the flow channel are means for educing the velocity of the liquid passing through the flow channel. More particularly, the apparatus of the present invention comprises:

i) a housing having a central bore,
ii) a central body in said bore, said central body being spaced from the wall of said central bore, with the space formed between said central body and said wall forming an extended flow channel with a small cross-sectional measurement in at least one dimension, said flow channel having an inlet opening and exit opening,
iii) a distribution chamber in said housing for distributing pressurized liquid through said inlet opening,
iv) a feed line from which the distribution chamber is fed pressurized liquid,
v) means for reducing the velocity of the liquid downstream said exit opening.

The flow channel is preferably formed in the shape of an extended gap at right angles to the direction of flow, particularly preferably in the form of a rotationally symmetrical annular gap.

The annular gap is more preferably formed by a conically expanding or narrowing rotationally symmetrical central body and an adapted conical bore in the housing body, wherein the central body and the housing body are displaceable against one another in the axial direction for the setting of the annular gap width.

Suitable means for reducing the velocity of the liquid passing through the flow channel include i) a baffle disposed downstream of the outlet opening of the flow channel, on which the liquid jet impinges, or ii) a screen disposed downstream of the outlet opening with a cross-sectional area which is greater by the factor of the velocity reduction than the cross-sectional area of the outlet opening.

The small cross-sectional measurement of the flow channel (i.e., the size of the annular gap) is preferably from to 0.05 to 1 mm, and more preferably from 0.1 to 0.5 mm. The length of the flow channel in the flow direction is preferably from 30 to 300 times, and more preferably 50 to 200 times, the small cross-sectional measurement.

Reactive components for the production of polyurethane plastics are preferably used. Polyurethanes are generally prepared by mixing and reacting two component streams. One stream is typically referred to as component A and includes aliphatic, cycloaliphatic, araliphatic, aromatic and heterocyclic polyisocyanates, as are described e.g. by W. Siefken in "Justus Liebigs Annalen der Chemie", 562, pages 75 to 136. Preferably used are aromatic polyisocyanates. It is most preferred to use commercially available aromatic polyisocyanates, such as, e.g., 2,4- and 2,6-toluylenediisocyanate, as well as any mixtures of these isomers ("TDI"); polyphenyl-polymethylene-polyisocyanates, such as are manufactured by anilineformaldehyde condensation and subsequent phosgenation ("crude MDI"); and aromatic polyisocyanates containing carbodiimide groups, urethane groups, allophanate groups, isocyanurate groups, urea groups or biuret groups ("modified polyisocyanates"). Particularly preferred modified polyisocyanates are those are derived from 2,4- and/or 2,6-toluylenediisocyanate.

The second stream is typically referred to as component B, which generally contains all the isocyanate reactive components and non-reactive additives. Useful isocyanate reactive materials include compounds containing at least two hydrogen atoms reactive with isocyanates and having molecular weights of between 60 and 5000, preferably between 100 and 2000, and most preferably between 200 and 800. Such compounds include those containing amino groups, thiol groups or carboxyl groups. Preferably such compounds contain hydroxyl groups. Particularly preferred hydroxyl group containing compounds contain 2 to 8 hydroxyl groups, in particular those with molecular weights of between 200 and 2000, and preferably 300 to 1200. Such hydroxyl containing compounds included, e.g. polyesters, polyethers, polythioethers, polyacetals, polycarbonates and polyester amides possessing at least 2, as a rule 2 to 8, preferably 2 to 6, hydroxyl groups, such as are known for the manufacture of polyurethane foams. Polyether polyols are quite particularly preferred. Compounds suitable for use as a polyol component are also described on pages 6 to 9 of European patent 121,851.

Additives which can also optionally be used include water, organic or inorganic blowing agents, foam stabilizers, catalysts and other auxiliaries and additives known in the polyurethane art. These known additives are disclosed on pages 9 to 11 of European patent 121,850.

Water is preferably also used as an additional blowing agent according to the invention in an amount of from 1 to 7 wt %, based upon the total weight of the reactive mixture. Water is most preferably used in an amount of from 2 to 5 wt %.

The various optional additives can be fed separately to the mixing assembly for the mixing of isocyanate component and polyol component or even fed prior to the mixing of isocyanate and polyol to one of the two main components. Of course, water and additional isocyanate reactive components are added to component B.

The process for manufacturing polyurethane foams is generally described in Becker/Braun, Kunststoff-Handbuch, Vol. 7: Polyurethanes, 1993, pages 143 to 149, in particular in FIG. 4.8 and FIG. 4.9 on page 148.

The components are preferably mixed in a so-called low-pressure agitated mixing chamber, wherein according to the invention a pressure prevails in the mixing chamber which lies above the saturation pressure for the dissolved carbon dioxide.

Carbon dioxide is dissolved in one or more of the components (preferably in the isocyanate-reactive) prior to the introduction of the components into the mixing head. Carbon dioxide is dissolved preferably in an amount of from 1 to 7 wt %, and most preferably from 2 to 5 wt %, based upon the weight of the total reactive mixture. The dissolving of the carbon dioxide, preferably only in the isocyanate-reactive component, can take place in any manner, e.g., a) gaseous carbon dioxide is mixed into the isocyanate-reactive component by means of an agitator, in a vessel containing the component and held at a pressure of 15 to 25 bar;

b) liquid carbon dioxide is mixed with the isocyanate-reactive component at room temperature, e.g., in a static mixer, at a pressure of 70 to 80 bar and then expanded to a pressure of 15 to 25 bar prior to introduction into the low-pressure agitated mixing head;

c) liquid carbon dioxide cooled to e.g. −20° C. is mixed at a pressure of 15 to 25 bar with the isocyanate-reactive component held at room temperature, wherein the mixing takes place in such a way that the carbon dioxide is dissolved in the component before it can evaporate.

It has been found that the preferred alternative c) is particularly successful, given the strong tendency of the carbon dioxide to dissolve, if a high-speed flow agitator is fitted in the isocyanate-reactive component line at the introduction point for the liquid carbon dioxide.

The components of the reactive mixture at least one of which contains the dissolved carbon dioxide are now fed to the mixing head, mixed there and after exiting from the mixing head expanded according to the invention with foam formation.

Provided that the composition of the reactive mixture favors the spontaneous formation of $CO_2$ adducts, e.g. of compounds containing hydroxyl groups, there is released, delayed by the required decomposition time of the adducts, additional $CO_2$, which leads to the enlargement of the foam bubbles already present If water is also used as chemical blowing agent, the foam "rises" further at the start of the isocyanate reaction with the water.

The invention will now be explained in detail by reference to the attached figures.

The foam forming apparatus 1 according to FIG. 1 consists of a housing 2 with a conically expanding bore into which a conically expanding central body 3 is inserted, wherein the conically expanding part of the housing 2 and the conically expanding part of the central body 3 form a flow channel 4 formed in the shape of a rotationally symmetrical, conically expanding gap. At the inlet side for the liquid into the flow channel 4 there is located within the housing a distribution channel 5 for the liquid, which distribution channel 5 is fed from a feed line 7 (see FIG. 2). In the embodiment shown the flow channel 4 is constructed with variable width and the central body 3 is formed so as to be movable in it in an axial direction. To this end the central body 3 has a cylindrical extension 8 which is accommodated in the casing 2 and is sealed against the casing by sliding seals 13, 14. The movement in axial direction of the central body 3 takes place in the embodiment shown by means of a hydraulic piston 10 which is connected to the cylindrical extension 8 and is movable in the axial direction in the cylindrical space 9 by means of hydraulic fluid lines 11 and 12.

The liquid containing carbon dioxide in dissolved form and introduced under pressure into the distribution area 5, in particular polyurethane reactive mixture, flows through the flow channel 4 as it expands. The liquid exits at high speed at the discharge end 15 of the channel 4. Baffle 6 is provided at right angles to the direction of flow of the liquid. The liquid impinges on the bafflewith the baffle dissipating the liquids kinetic energy turbulently. The liquid then exits through the outlet cross-section 16 accompanied by foaming.

FIG. 3 shows an apparatus according to FIG. 1, in which the flow channel 4 is formed tapering in the flow direction and the baffle 6 is located within the outlet cross-section 16.

FIG. 4 shows an embodiment of the present invention according to FIG. 1, in which the distance of the baffle 6 from the outlet opening 15 of the flow channel 4 in the axial direction is variable. In the view shown the distance can be varied by means of the screw thread 17.

FIG. 5 shows an apparatus according to the invention in which there is provided as a means of reducing the velocity of the liquid after exiting from the gap 4 a screen or perforated grid 18. The distance of the perforated grid 18 from the central body 3 can be set by means of screw thread 17. The screw thread 17 engages with a slip ring 19 which is connected by a rod 20 to the central body 3. In this way the distance of the screen 18 from the central body 3 can be maintained, once it has been set, by variation of the width of the gap 4 by axial movement of the central body 3.

FIG. 6 shows an embodiment of the present invention in which the conical bore in the housing 2 comprises at the outlet end of the gap 4 a cylindrical part 21, and wherein there are provided in the cylindrical part of the gap 4 flow divider elements 22, which divide up the annular gap 4 at the discharge end into a large number of outlet openings 23. FIG. 7 represents a section B—B of FIG. 6.

FIG. 8 shows the use of the foam forming apparatus 1 according to the invention in a conventional plant for manufacturing polyurethane slabstock foam. There is fed to the mixing assembly 30 via line 31 the isocyanate-reactive component, which contains carbon dioxide in dissolved form, and via line 33 the isocyanate component. In addition conventional auxiliaries and additives are introduced into the mixing head via line 32. The polyurethane reactive mixture passes out of the mixing head 30 via the feed line 7, at a pressure that lies above the saturation vapor pressure for the dissolved carbon dioxide, into the foam forming apparatus 1. At the outlet end of the foam forming apparatus 1 the polyurethane reactive mixture foams up. The foam 34 is deposited on a bottom laminating film 35, which is moved away from the foam forming apparatus 1 on the conveyor belt 36. An upper laminating film 37 can also be supplied.

It is possible, by control of the feed rate of the feed pumps (not shown) for supplying the reactive components to the mixing assembly 30 via lines 31 and 33 and hydraulic adjustment of the flow channel 4 (FIG. 3), on the one hand to adjust the pressure in the feed line 7 and on the other to adjust the rate of shear in the flow channel 4 as a function of the viscosity of the reaction mixture containing carbon dioxide.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Apparatus for manufacturing foam from a liquid containing gas under pressure in dissolved form by expansion of the liquid to a pressure below the saturation pressure for the dissolved gas and release of the gas, comprising i) a housing having a central bore,
 ii) a central body in said bore, said central body being spaced from the wall of said central bore, with the space formed between said central body and said wall forming an extended flow channel with a small cross-sectional measurement in at least one dimension, said flow channel having an inlet opening and exit opening,
 iii) a distribution chamber in said housing for distributing pressurized liquid through said inlet opening,
 iv) a feed line from which the distribution chamber is fed pressurized liquid,
 v) means for reducing the velocity of the liquid downstream said exit opening.

2. The apparatus of claim 1, wherein the flow channel is an annular groove formed in the shape of a cone and the central body defining the annular groove is axially displaceable for the setting of the small cross-sectional measurement.

3. The apparatus of claim 1, wherein the length of the flow channel in the flow direction is between 30 and 300 times the small cross-sectional measurement.

* * * * *